J. A. QUINLAN.
INSIGNIA HOLDER FOR AUTOMOBILES.
APPLICATION FILED FEB. 6, 1919.
1,306,390.
Patented June 10, 1919.
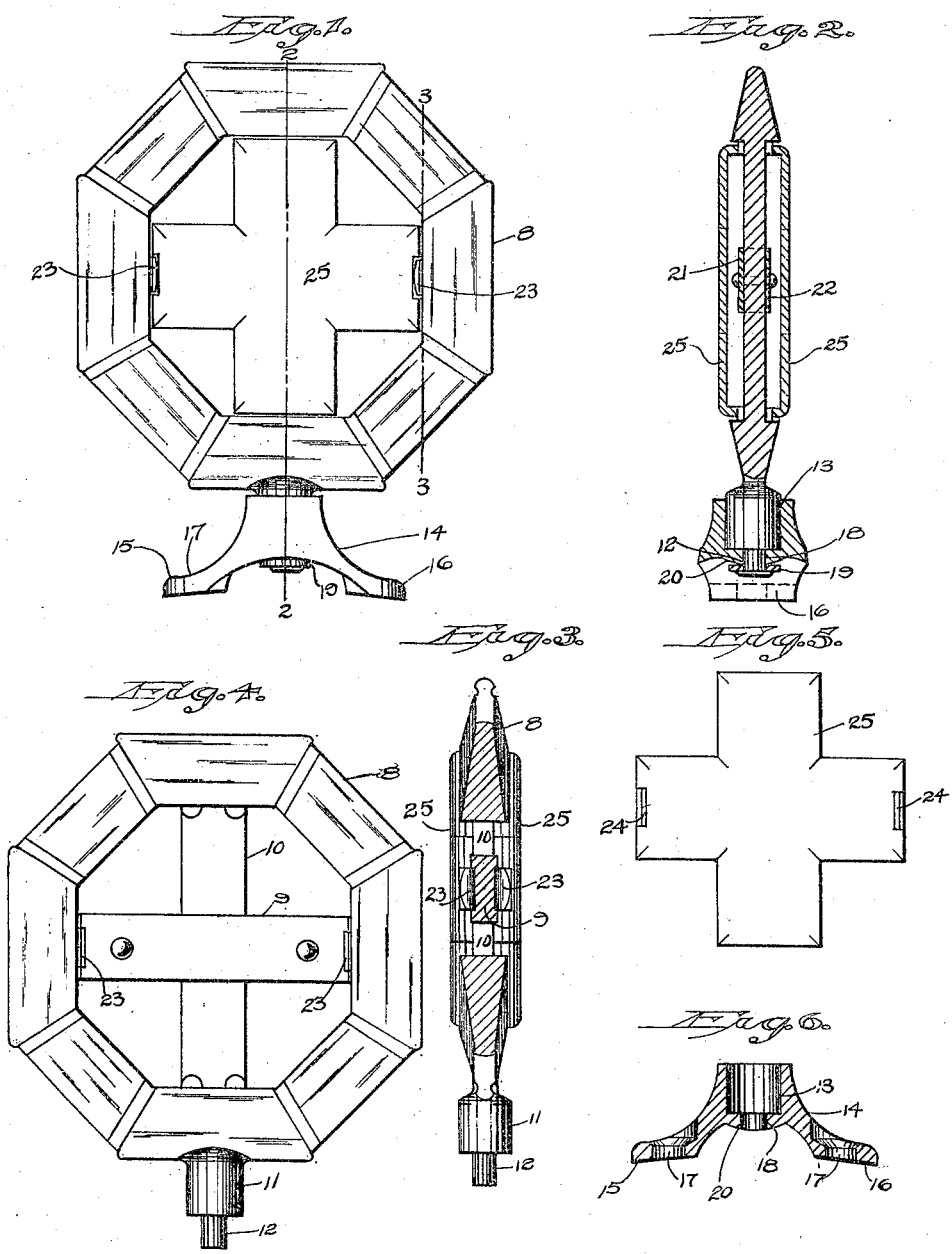

UNITED STATES PATENT OFFICE.

JAMES A. QUINLAN, OF SOUTHINGTON, CONNECTICUT.

INSIGNIA-HOLDER FOR AUTOMOBILES.

1,306,390.      Specification of Letters Patent.      Patented June 10, 1919.

Application filed February 6, 1919. Serial No. 275,312.

*To all whom it may concern:*

Be it known that I, JAMES A. QUINLAN, a citizen of the United States, residing at Southington, in the county of Hartford and State of Connecticut, have invented a new and useful Improvement in Insignia-Holders for Automobiles; and I do hereby declare the following, when taken in connection with the accompanying drawings and the characters of reference marked thereon, to be a full, clear, and exact description of the same, and which said drawings constitute part of this application, and represent, in—

Figure 1 a face view of an insignia holder for automobiles constructed in accordance with my invention.

Fig. 2 a sectional view on the line 2—2 of Fig. 1.

Fig. 3 a sectional view on the line 3—3 of Fig. 1.

Fig. 4 a front view of the frame separated from the base, and with the insignia removed.

Fig. 5 a face view of the insignia, detached.

Fig. 6 a transverse sectional view of the base, detached.

This invention relates to an improvement in insignia holders for automobiles. It is quite common for automobiles to carry an insignia of some character, for instance, physicians in some places carry a green cross in plain view, so that a traffic officer may recognize his car as that of a physician and hence give him the right of way.

The object of this invention is to provide an insignia holder which may be readily mounted upon the radiator cap of various styles, and which permits of adjustment of the insignia holder so that it will always stand in the desired position, and a holder to which any desired insignia may be applied; and the invention consists in the construction hereinafter described and particularly recited in the claim.

In carrying out my invention as herein shown, I employ a frame 8 of any desired design, herein shown as octagonal, and includes a horizontal bar 9, and may have a vertical bar 10. At the bottom the frame is formed with a round stud 11 and a reduced stem 12. The stud 11 closely fits into a socket 13 formed in a base 14 which is transversely bowed and has two feet 15 and 16 each of which has a perforation 17 through which screws may extend so that the base may be attached to an ordinary radiator cap. In the bottom of the socket 13 is a hole 18 through which the stem 12 passes, and the end of the stem is upset over a washer 19 so as to firmly connect the frame with the base yet permit of turning one with relation to the other as may be necessary for adjusting the frame to proper position. Preferably and as herein shown the base will be formed with a convex boss 20 around the hole 18 and against which the washer 19 will bear. Secured to the transverse bar 9 on opposite sides are plates 21 and 22 formed at opposite ends with outwardly extending lips 23 which extend through slots 24 formed in the sides of the insignia 25 and are turned down so as to firmly secure the insignia to opposite sides of the frame. As herein shown the insignia is in the form of a cross, but it will be understood without further illustration, that it may be of any preferred design.

With my construction the insignia may be attached to any style of automobile radiator caps. The frame may be adjusted so as to stand at the desired angle, and the insignias are readily and securely connected with the frame. The frame and base may be easily cast and the insignias struck up from sheet metal so that the device is produced at a very low cost for manufacture.

I claim:—

An insignia holder comprising a frame having a transverse bar, plates secured to said bar and terminating in fingers, an insignia formed with slots through which said fingers extend and by which the insignias are connected with the frame.

In testimony whereof, I have signed this specification in the presence of two subscribing witnesses.

JAMES A. QUINLAN.

Witnesses:
THOMAS F. WELCH,
EDWIN G. LEWIS.

Copies of this patent may be obtained for five cents each, by addressing the "Commissioner of Patents, Washington, D. C."